United States Patent [19]

Dülk

[11] Patent Number: 4,595,877
[45] Date of Patent: Jun. 17, 1986

[54] INDUCTIVE LOOP SYSTEM FOR DETECTION OF AN ELECTRICALLY CONDUCTIVE OBJECT

[75] Inventor: Károly Dülk, Budapest, Hungary

[73] Assignee: Vilati Villamos Automatika Fovallalkozo es Gyarto Vallalat, Budapest, Hungary

[21] Appl. No.: 662,263

[22] Filed: Oct. 18, 1984

Related U.S. Application Data

[62] Division of Ser. No. 393,302, Jun. 29, 1982, abandoned.

[30] Foreign Application Priority Data

Aug. 3, 1981 [HU] Hungary ............................ 2248/81

[51] Int. Cl.$^4$ ..................... G08G 1/01; G01N 27/72; G01V 3/11
[52] U.S. Cl. ................................. 324/239; 324/329; 324/336; 340/941
[58] Field of Search ............... 324/234, 238, 239, 240, 324/326–329, 336; 340/551, 941

[56] References Cited

U.S. PATENT DOCUMENTS

| | | | |
|---|---|---|---|
| 3,263,160 | 7/1966 | Dolan et al. | 324/336 |
| 3,315,155 | 4/1967 | Colani | 324/336 |
| 3,538,430 | 11/1970 | Bulgakov et al. | 324/336 |
| 3,737,768 | 6/1973 | Lazenby et al. | 324/336 |
| 4,247,821 | 1/1981 | Buselli et al. | 324/336 |

*Primary Examiner*—Gerard R. Strecker
*Attorney, Agent, or Firm*—Toren, McGeady, Stanger, Goldberg & Kiel

[57] ABSTRACT

An eddy-current loop detector operates to sense the presence of an electrically conductive object by applying D.C. onto a conducting loop so that a permanent magnetic field is induced, which field partly penetrates into the object; ensuring the quick cessation of self-inductive transient operation of the loop when the D.C. is switched off; and measuring the change in the part of the flux passing through the measuring loop arising from eddy-currents induced in the conductive object, and evaluating such change while the relatively slowly decreasing flux is maintained. By repeating these operations with the desired frequency, the eddy-current detector is well suited for continuous measuring of the position of the object.

8 Claims, 6 Drawing Figures a)

b)

INDUCTIVE LOOP SYSTEM FOR DETECTION OF AN ELECTRICALLY CONDUCTIVE OBJECT

This application is a division of application Ser. No. 393,302 filed June 29, 1982, now abandoned.

The invention relates to a process and a circuit arrangement for the detection by means of a conductive loop, in particular for detecting vehicles on public roads, pipelines, or any other object mainly made of metal, and being electrically conductive.

It is a well known fact that detection with a conductive loop involves several advantages, e.g.:

the spatial part of detection can be well limited, by changing the geometry of the loop, limits of detection may also be changed, electrically non-conductive objects do not disturb the measuring process, the measuring unit does not require maintenance.

Out of the known processes, those applying an inductive loop have become widespread, wherein the detecting loop forms an inductive member of an oscillating circuit (in the majority of cases with a resonance-frequency about 10 kHz). The detection itself is based on the phenomenon that the inductance of the loop is influenced by objects being electrically conductive and lying in the vicinity of the loop so that, due to the eddy-current effect, the flux generated by the loop is displaced by the volume of the objects. Due to the change in inductance, the frequency of the oscillating circuit is also changing and there is a definite correlation between this change and the distance of the object and other parameters, respectively. Measuring is taking place in one phase.

One of the known processes is described in U.S. Pat. No. 3,943,339 "Inductive loop detector system". Other processes also using inductive loops, however, differing in signal processing methods are specified in U.S. Pat. Nos. 2,943,306 "Vehicle detector" and 3,164,802, as well as in German Pat. No. DE-PS 2 817 670 "induktionsschleifendetektor für Verkehrszähleinrichtungen".

However, these processes have, beside the advantages mentioned before, some disadvantageous features too. In case the change in loop inductance caused by the object is small (of the order of magnitude of $10^{-2}$ or even less), either because of an insignificant volume of the object, or a large distance between the loop and the object, detection by measuring absolute inductance in a continuous manner involves serious difficulties, and beyond certain limits, it cannot be even realized.

The difficulties result from the fact that the parameters of the oscillating circuit and the processing circuit are also changing under the influence of temperature, aging of the components, etc. resulting in sensing of small signals amounting to an erroneous detection. Even in the case, when ideal, i.e., infinitely stable circuit elements are supposed, the error resulting from the deformation of the loop cannot be eliminated. As a consequence, the processes using an inductive loop detector system are not based on the measuring of the absolute inductance, but relative inductance is measured, i.e., the change in inductance compared to a value having been measured in a previous period is sensed.

To establish the connection between this relative change and the sensed object, several solutions have been proposed partly the previously mentioned publications, partly French Pat. No. FR-PS 1 555 659 "Fahrzeugdetektor", and Japanese Pat. No. 42-52834 "Anordnung zum Nachweisen von Fahrzeugen auf einer mehrspurigen Strasse" described these solutions.

However, due to the relative measuring method, the processes using inductive loop detector systems involve two fundamental deficiencies.

First, if the object does not change its position for a certain time, the detector "forgets" the object.

Secondly, after switching-on or failure of the supplying voltage, the detector is unable to decide (since the value of the precedent loop inductance is not known), whether there is an object to be detected in its environment or not.

For the inductive loop detector produced by the CANOGA company on the basis of U.S. Pat. No. 3,943,339—showing, according to our knowledge, the best parameters among the known systems—a holding time of max. one hour is guaranteed, when the object is causing a change in loop inductance of the order of magnitude of $10^{-3}$.

The aim is achieved in that there is provided an inductive loop detector system consisting of an exciting loop and a measuring loop, the exciting loop being connected to the direct voltage via the switching element; the measuring loop being connected via the shaper-amplifier circuit to the control circuit, with the control circuit being provided with an information output. One of the outputs of the control circuit is connected to the control input of the switching element, while the other output thereof is connected to the inhibiting input of the shaper-amplifier circuit.

It is advantageous, when, between the terminals of the exciting loop, an overvoltage inhibitor is connected.

It is also advantageous if the exciting loop and the measuring loop are formed as a single common loop.

A further advantage is achieved when, between the switching element and the direct voltage, a local current matching energy transformer is inserted.

It is of additional advantage to insert between the switching element and the exciting loop a local current matching energy transformer. It is advantageous to divide the control circuit into two parts, with the part ensuring the direct control of the circuits servicing the loop being arranged in the vicinity of said loop, while the other part is arranged remote from said loop, e.g., in a central measuring station. It is also advantageous, when a plurality of loops are contained by the system, which are partly provided with a common control circuit.

Finally, it is also advantageous, when the projection of the measuring loop to be formed along the magnetic lines of force of the noise flux, on the surface lying perpendicularly thereon, contains at least one loop element whose direction of winding contrasts to that of the other loop elements.

The circuit arrangement according to the invention will be described by means of some preferred embodiments serving as an example, and by the aid of the enclosed drawings, wherein FIG. 1 shows schematically the circuit arrangement according to the invention, wherein the excitation loop and the measuring loop are formed as a common loop and the object to be detected is not made of a ferromagnetic material, FIG. 2 shows the connecting arrangement of the excitating loop and the measuring loop, FIG. 3 is a block diagram of a control circuit;

Figure 1:
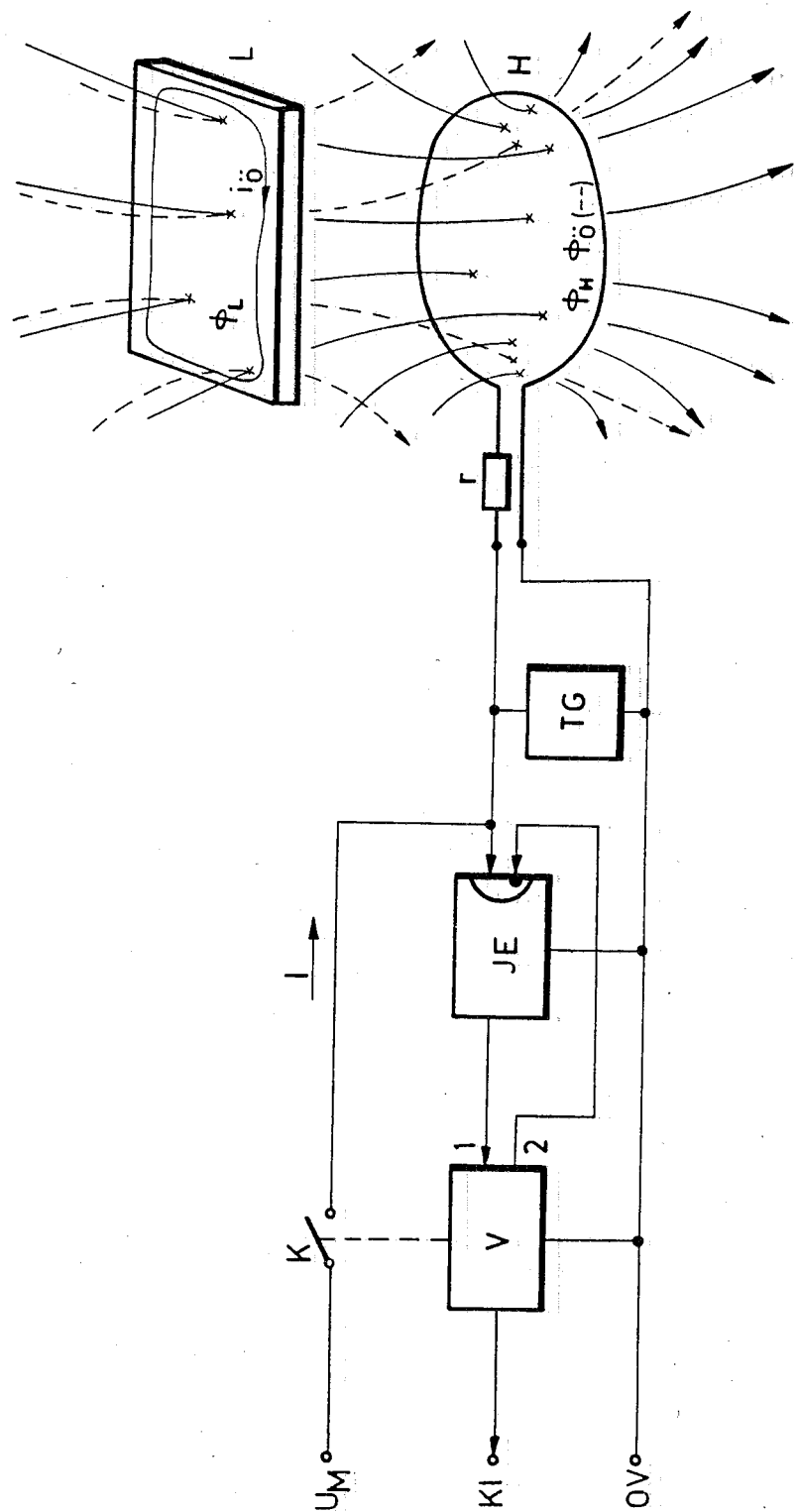

The invention will be explained by means of the arrangement to be seen in FIG. 1. FIG. 1 shows an electrically conductive object L lying in the vicinity of the loop H. One end of the loop H is connected to the point OV, while the other end is connected via a resistor r to one of the terminals of an overvoltage inhibitor TG and to one pole of a switching element K, as well as to the input of a shaping and amplifying unit JE. The other pole of the switching element K is connected to a voltage $U_M$. The output of the shaping and amplifying circuit JE is connected to the input of a control circuit V, while one of the outputs thereof is connected to the control input of the switching element K (being indicated by the discontinuous line in FIG. 1). Another output of control circuit V connects with the inhibiting input of the shaping-amplifying unit JE, and the control circuit also is provided with the output KI. In general, the resistor r forms the inner resistance of the loop.

The measurement with the inductive loop detector system is carried out in three phases, as follows:

the conductive loop is supplied with D.C. excitation, excitation is performed minimally as long as the flux of the loop is penetrating into the object to an extent which approximates the static state despite the eddy-currents existing in the electrically conductive object in the environment of the loop or on the surface layers thereof;

excitation of the conductive loop is interrupted and delayed until the self-inductive transient phenomena practically cease in the loop;

in the conductive loop, there is measured the voltage which is induced by the slowly decreasing fluxes being maintained by the eddy-currents in the object (with a polarity contrasting to that in the course of switching).

First, the condition will be described, in which the electrically conductive object L is not arranged in the vicinity of the loop H.

When the switching element K is closed, current is applied onto the loop H (first phase). In order to be able to decrease losses, it seems to be expedient, if the current is restricted but by the inductivity of the loop H and the ohmic resistance of the resistor r.

It is, the D.C. component of this current which is dominating, i.e., the D.C. inducing component induces the flux $\phi_H$ in the loop H.

When the switching element K is switched-off, the flux $\phi_H$ ceases completely within a rather short time in view of the voltage having been determined by the overvoltage inhibitor TG, expediently with a Zener-character. (The self-inductive transient process is finished—the second phase.)

Thereafter the loop H is quiescent, theoretically the voltage on the terminal points equals to zero.

The function of the overvoltage inhibitor TG can be performed by another unit of the circuit as well. The loop H is furthermore connected to the shaping-amplifying circuit JE—which can be inhibited—, and which is actually inhibited by the control circuit V from the beginning of the closing of the switching element K up to the end of the self-inducting transient processes.

The output of the shaping-amplifying circuit JE—being expediently provided with an integrating anti-interference unit—is connected to the input of the control circuit V. Beside performing the control of the other circuits of the detector, the control circuit V functions as a matching, comparing and signal processing circuit.

Accordingly, after the self-inductive transient process has been finished, the shaping-amplifying circuit JE—after being released from inhibition—is sampling the voltage to be measured on the terminal points of the loop which has been pre-processed by the shaping-amplifying unit JE. (Third phase.)

Taking into consideration that practically the voltage equals zero, the control circuit V is giving corresponding logical information on the output KI, thereafter—with a pre-set frequency—the measuring period is newly started.

In case there is an electrically conducting object L arranged in the environment of the loop H, the process will be modified, as follows:

The part $\phi_L$ of the flux $\phi_H$ penetrates into the conducting object, e.g., a metal sheet; specifically it passes therethrough with a speed depending from the eddy-currents arising in the metal sheet L and couples the sheet to the loop. The duration of closing of the switching element K is controlled by the control circuit V in such a manner that the extent of the flux coupling should expediently approximate the static value.

After switching-off the switching element K, the part of the flux, $\phi_H-\phi_L$, which did not penetrate through the sheet, ceases very rapidly in the same manner as in the previous case.

The eddy-currents $i_ö$ allow the flux $\phi_L$ to cease at an essentially lower rate.

After the extinction of the loop current I, the flux $\phi_L$ is rearranged in the field, and taking into consideration that now the metal sheet L became also an exciting element, only the part $\phi_ö$ of the flux $\phi_L$ is passing through the loop H.

The slow decrease of the flux $\phi_ö$ is inducing a direct current in the loop H, which can be well recognized during the sampling period.

Accordingly, an elementary measuring cycle is taking place in three phases. When repeating the cycle with the desired frequency, continuous measuring can be realized.

The process having been described here is similar to circuit arrangements with more than one loop and/or to objects made of ferromagnetic material, however, the arrangement of the flux will change.

Figure 2:
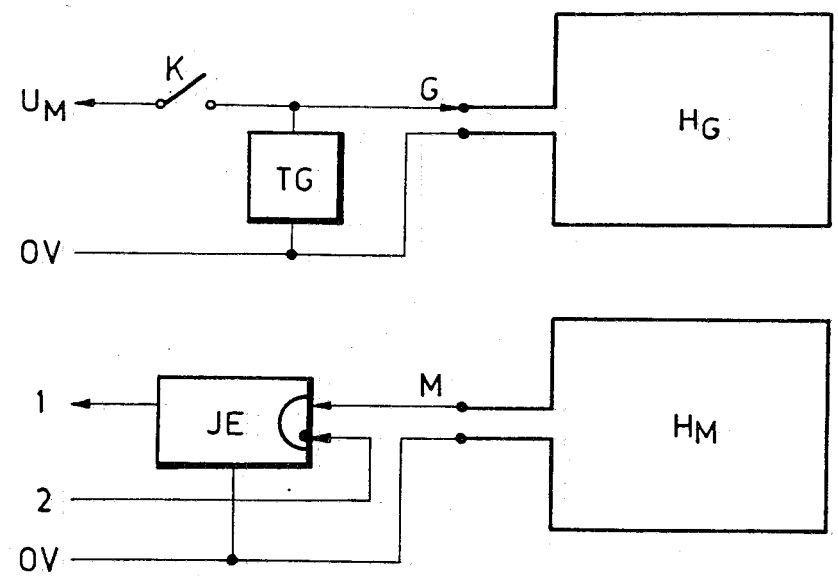

The loop connection of the arrangement with two loops is to be seen in FIG. 2. The single units of the circuit arrangement not illustrated here are corresponding to those of FIG. 1.

Figure 3:
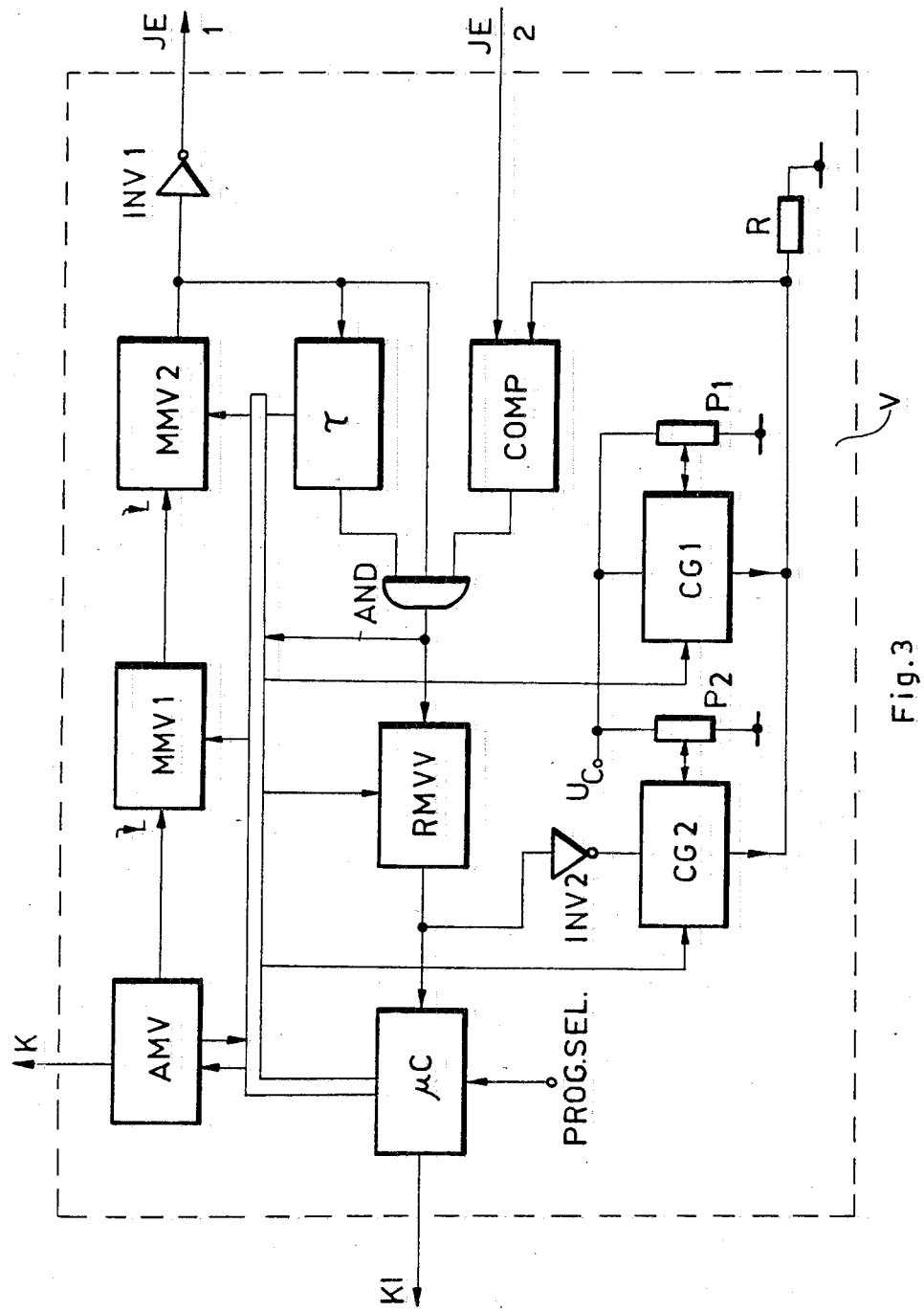

In accordance with the prevailing requirements, the control unit V may process the signals with changing amplitudes arriving during sampling in different manners. In the most simple form, the signals are compared to a comparator level and yes-no information is delivered. When designed in a different manner, e.g., set for analogue measuring, the distance between the object and the loop, etc. can be given. In case of necessity, e.g., in a noisy environment, logical error correction or level conversion may be performed. One of several possibilities for the circuit arrangement of the control unit V is shown in FIG. 3, wherein:

AMV—the controllable astable flip-flop,
MMV—the monostable flip-flop,
RMMV—the monostable flip-flop with the possibility of restarting,
$\mathcal{V}$—delay element,
AND—AND gate, INV—inverter,
COMP—comparator,
μC—microcomputer (the input PROG.SEL serves for selecting the desired program out of the several programs contained therein,
CG—controllable generator,
P—regulating element of the generator,
R—resistor
$U_c$—direct voltage.

In a simple case, the elements μC, RMMV, INV2, CG2 and P2, as well as the elements CG1 and R can be omitted one by one, or all together. In case, if the elements CG1 and R are not contained in the circuit arrangement, the reference input of the comparator COMP is connected directly to the element P1.

First of all, let us examine the case when the control unit V does not contain the μC microcomputer. In this case, the time period of the measuring process is controlled by the controllable astable flip-flop AMV, while the durations of each phase of the measuring process are controlled by the monostable flip-flops MMF1, MMV2 and the delay element τ.

By means of the generator CG1, the level of comparison may be adjusted, while the generator CG2 serves for the adjustment of hysteresis, being of importance mainly in a noisy environment.

Time-setting of the monostable flip-flop RMMV with the possibility of restarting is expediently longer, than the time period of the astable flip-flop AMV. In such a manner, continuity of signal level can be achieved on the output K1.

In case, if the control unit V contains the microcomputer μC, the microcomputer μC is able to perform the function of the majority of the circuit elements shown in FIG. 3, (AMV, MMV1, MMV2, τ, INV1, INV2, AND, RMMV). In a noisy environment, the microcomputer μC may have several measuring programs with error corrections.

With one of the simple versions, changing of the measuring results are accepted only then, if the results existed in two or three periods. In this case, the correctness of the measuring results—having been obtained according to a widened program—is controlled by the microcomputer μC in an essentially shorter periodical measuring time, than the periodical time of the normal measuring process.

The microcomputer μC may perform analogue measurement by regulating the reference level of the comparator COMP.

For a better understanding, there is set forth below an example for a preferred embodiment of the inductive loop detector system according to the present invention.

The control circuit V contains from among the elements shown in FIG. 3 the following:
controllable astable flip-flop AMV,
monostable flip-flop MMV1,
monostable flip-flop MMV2,
delay element,
AND gate,
comparator COMP.

In this example: The loop H itself is a winding of 5 turns, of rectangular shape of 2 m×2 m; the ohmic resistance r of the loop H is cca. 1 Ohm; the overvoltage inhibitor is realized with a 39 V Zener diode; the value of the power supply voltage $U_M$ is 3 V; the frequency of the astable flip-flop AMV, which determines the frequency of the measurements is 10 Hz, with a pulse width of 0.2 msec; the pulse width of the monostable flip-flop MMV2, which determines the duration of the measurement, is 0.5 msec; the time constant of the delay element is 0.01 msec; and the threshold level set on the comparator COMP is 1 V.

An inductive (eddy-current) loop detector system realized with the technical data as described above can be used reliably for detecting road vehicles, in the case of noiseless surroundings.

In this case, the loop should be placed in a groove milled in the pavement. With the technical data described above, the inductive loop detector is able to detect a motorcycle or a road vehicle of greater mass passing over the field above the loop, if the height of the axle is 0.5 m, as a maximum.

The presence of a vehicle is demonstrated by a pulse-series on the output of the AND gate, and when there is no pulse on this output, it indicates that no vehicle is passing over the loop.

By changing the geometric sizes, the number of turns, the value of the power supply voltage $U_M$ or any other parameter of the control circuit V, the detector sensitivity, the distance of detection and the rate of detection can be varied between broad limits.

If, for example, the loop is an annular winding of 0.05 m diameter and the other technical data is unchanged, the inductive loop detector will be able to detect small metal objects, but, on the other hand, the maximal distance of detection will decrease to about 0.03 m.

By increasing the number of turns of the loop, the distance of detection can be increased, for example, in the case of 50 turns, the distance of detection will be cca. 0.15 m. Beside the schematical arrangements to be seen in FIGS. 1 and 2, the loop detector with the eddy-currents can be formed in several manners; some possible embodiments are described below:

1. It may often happen, that the distance between the loop and the location where information is to be collected and the energy is supplied, is large. Accordingly, the significant currents required by the loop $H_G(H)$ can be supplied with difficulties only.

In this case, with one version of the eddy-current loop detector, before or after the switching element K, a local energy transformer (e.g., a transverter) is used, as a consequence, smaller current may flow on the line with a larger voltage.

2. In case of remote measuring places, the functions of the control circuit V of the eddy-current loop detector are expediently divided into two parts: Accordingly, the part of the control circuit V, which is definitely needed for servicing the other circuits having been arranged in the environment of the loop $H_G$, $H_M(H)$—in accordance with FIG. 3, minimally the elements MMV1, MMV2, INV1, AND, τ, COMP and P1—is arranged in the same unit, while the other part, performing mainly logical signal processing (in accordance with FIG. 3, the elements AMV, RMMV and μC) are arranged at the information collecting location or in the center.

3. A system containing more eddy-current loop detectors may be advantageously formed in such a manner that the central part of the divided control units is formed as a common part.

4. With one of the embodiments of the eddy-current loop detector having a divided control unit, the two parts are formed with one or more separate channels for the signal transmission as well as with matching units. The channels for signal transmission are arranged either on a separate core, or they are formed on the core for energy transmission.

Figure 4:
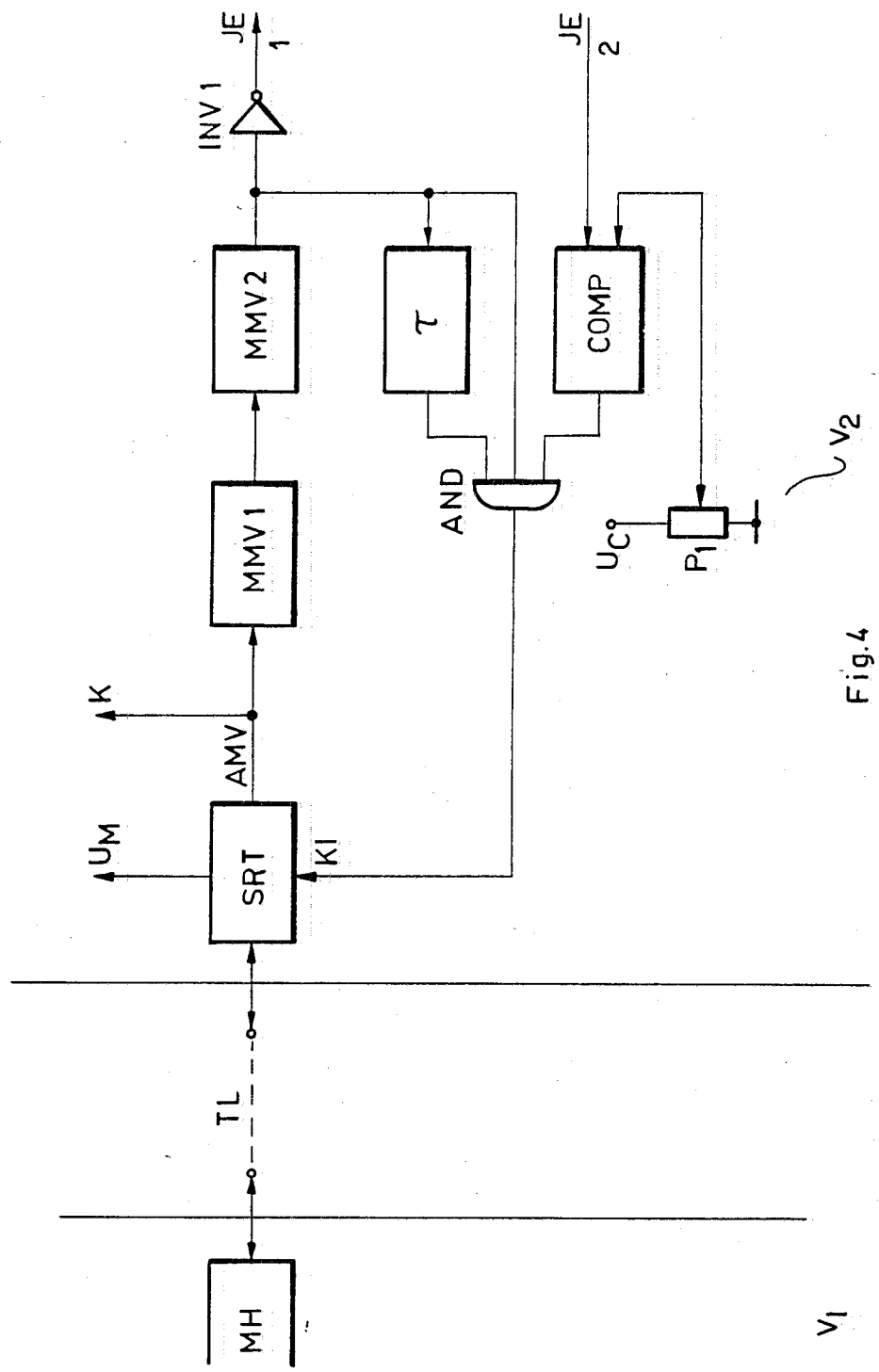
FIG. 4 shows another embodiment with a divided control unit.

One of the versions is shown in FIG. 4, wherein

MH—the location where processing of the measuring results is taking place,

TL—the line for energy and data transmission,

SRT—transmitter-receiver and supply energy separating unit.

Figure 5:
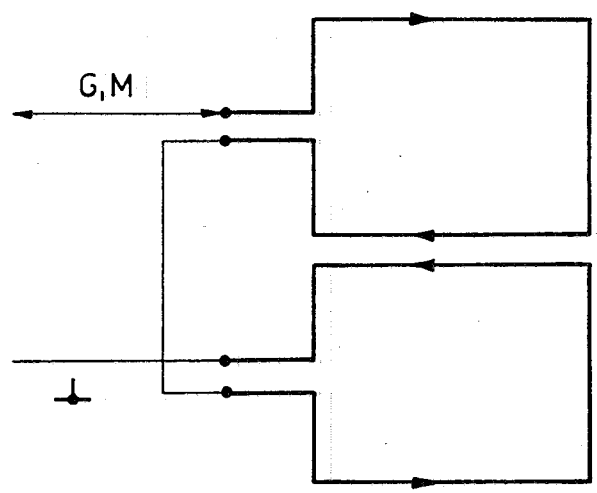
FIGS. 5a and 5b show the most simple formations of the compensated loops.
Figure 5:
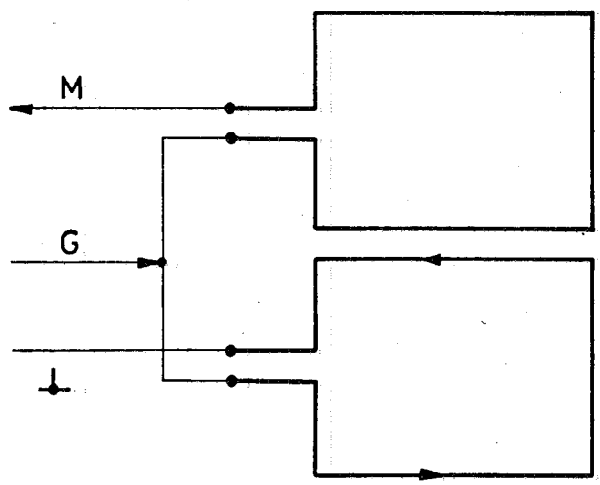

5. With some preferable embodiments, the eddy-current loop detectors are formed so that, in order to suppress the magnetic noise of the environment, the loop(s) is (are) formed as compensated loop(s). The most simple versions of the compensated loops are illustrated in FIG. 5. This formation of loops is well suitable for the suppression of magnetic noises,—or at least reducing them—, since the change of the noise flux induces in the loop elements which are wound with an opposite direction, voltages with opposite signs.

The voltage on the terminals of the loop equals the sum of the voltage of the single loop elements, that means, that the voltages of different signs are subtracted from each other.

In case, if the extent of the change in the noise flux is the same in both of the loop elements having been wound with an opposite sign, the disturbing noise is completely compensated.

At the same time, detection of the useful signal is scarcely influenced by the embodiment of the invention shown here.

The process, according to the invention, realizes the main aim, insofar as the measuring process should show an absolute character. In distances surpassing three to five times the diameter, the reaction will be reduced already by the sixth power of the distance (with inductive detectors only by the third power), accordingly remote conductive objects may be completely neglected.

Accordingly, when there is no electrically conductive object in the vicinity of the loop, the measurable signal equals zero, while at the appearance of the object, the signal considerably deviates from zero.

The eddy-current detector, as described, can be applied on several fields for recognizing the electrically conductive objects, however, the advantages become most obvious, when the environment is significantly contaminated (dust, rain, fog, snow, mud, etc. ), temperature is rapidly and considerably changing, the measuring loop is subjected to a certain deformation, continuous measurement without subsequent adjustment is required.

I claim:

1. Circuit arrangement for the detection of an electrically conductive object by means of a conductive loop, comprising loop means forming an exciting loop and a measuring loop, a direct current voltage source and a switching element, one terminal of which is connected to the direct current voltage source wherein the exciting loop is connected to the direct current voltage source through operation of the switching element, a measuring cycle commencing upon operation of said switching element; a shaping-amplifying circuit having an input connected to the loop means for pre-processing and sampling the voltage across the measuring loop, said shaping-amplifying circuit having an inhibiting input to inhibit operation of the shaping-amplifying circuit following closing of the switch until after a self-inductive transient has died out following switch closing, a control circuit for controlling the sequence of operation and functional interrelation of elements of the detection circuit arrangement having an input connected to the output of the shaping-amplifying circuit and an information output, said information output providing a logical signal when indicating the voltage measured by the shaping-amplifying circuit is approximately zero for permitting restart of a measuring cycle; a second output of the control circuit being connected to a control input of the switching element, and a third output of the control circuit being connected to said inhibiting input of the shaping-amplifying circuit.

2. Circuit arrangement according to claim 1, comprising an overvoltage inhibitor connected between the terminals of said loop means.

3. Circuit arrangement as claimed in claim 1, wherein the exciting loop and the measuring loop of the loop means are formed as one single common loop.

4. Circuit arrangement as claimed in claim 1, comprising a local current matching energy transformer inserted between the switching element and the direct current voltage source.

5. Circuit arrangement as claimed in claim 1, comprising a local current matching energy transformer inserted between the switching element and the exciting loop.

6. Circuit arrangement as claimed in claim 1, wherein the control circuit is divided into two separate parts so that one part directly controls the circuits servicing the loop means and is arranged in the vicinity of the loop means and the other part is arranged remote from the loop means at a central measuring location.

7. Circuit arrangement as claimed in claim 1, including more than one loop all of which are provided with a common control circuit.

8. Cuircuit arrangement as claimed in claim 1, wherein the projection of the measuring loop to be formed along the magnetic lines of force of flux noise, on the surface lying perpendicularly thereon, contains at least one loop element the winding direction of which is opposite to that of the other loop elements.

* * * * *